(12) United States Patent
Bradford et al.

(10) Patent No.: US 7,657,333 B2
(45) Date of Patent: Feb. 2, 2010

(54) ADJUSTMENT OF DATA COLLECTION RATE BASED ON ANOMALY DETECTION

(75) Inventors: Jonathan D. Bradford, Harpersfield, OH (US); Timothy Siorek, Newbury, OH (US); Martin George Gach, Mentor on the Lake, OH (US); Mark Joseph Balewski, Independence, OH (US); Robert J. Kretschmann, Bay Village, OH (US); Kendal R. Harris, Mentor, OH (US); Kenwood H. Hall, Hudson, OH (US); Charles Martin Rischar, Chardon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 148 days.

(21) Appl. No.: 11/862,983

(22) Filed: Sep. 27, 2007

(65) Prior Publication Data

US 2009/0089558 A1 Apr. 2, 2009

(51) Int. Cl.
*G05B 13/02* (2006.01)
*G05B 11/01* (2006.01)

(52) U.S. Cl. .............. 700/51; 700/34; 700/46; 700/52; 700/53; 700/73; 707/10; 709/248; 713/375; 713/400

(58) Field of Classification Search .......... 700/34, 700/46, 51–53, 55, 73–75; 707/10; 709/248; 713/375, 400

See application file for complete search history.

(56) References Cited

U.S. PATENT DOCUMENTS

| 5,099,449 | A | * | 3/1992 | Dombrosky et al. ......... 710/58 |
| 5,764,927 | A | * | 6/1998 | Murphy et al. ............. 710/105 |
| 5,815,689 | A | * | 9/1998 | Shaw et al. ................ 713/400 |
| 6,728,584 | B1 | * | 4/2004 | Duan et al. .................. 700/94 |
| 6,732,287 | B1 | * | 5/2004 | Siorek et al. ............... 713/500 |
| 2004/0174818 | A1 | * | 9/2004 | Zocchi ....................... 370/241 |
| 2006/0200743 | A1 | * | 9/2006 | Thong et al. ............ 715/500.1 |
| 2007/0260410 | A1 | * | 11/2007 | Raymond .................... 702/81 |
| 2008/0107336 | A1 | * | 5/2008 | Angrilli et al. ............. 382/173 |
| 2008/0205499 | A1 | * | 8/2008 | Ridel et al. ................. 375/222 |

* cited by examiner

*Primary Examiner*—Ramesh B Patel
(74) *Attorney, Agent, or Firm*—Turocy & Watson LLP; R. Scott Speroff

(57) ABSTRACT

Systems and methods that vary multiple data sampling rates, to collect sets of data with different levels of granularity for an industrial system. The data for such industrial system includes sets of data from the "internal" data stream(s) (e.g., history data collected from an industrial unit) and sets of data from an "external" (e.g., traffic data on network services) data stream(s), based in part on the criticality/importance criteria assigned to each collection stage. Each set of data can be assigned its own unique data collection rate. For example, a higher sample rate can be employed when collecting data from the network during an operation stage that is deemed more critical (e.g., dynamic attribution of predetermined importance factors) than the rest of the operation.

20 Claims, 12 Drawing Sheets

ADJUSTMENT OF DATA COLLECTION RATE BASED ON ANOMALY DETECTION

TECHNICAL FIELD

The subject invention relates generally to industrial network systems that employ network traffic analyzers, and more particularly to a flexible data collection rate associated with industrial units in such environments.

BACKGROUND

Advances in computer network technologies continue to make sharing of information between systems increasingly efficient and affordable. Such advances have resulted in an increasing exploitation of networked systems, wherein new transmission infrastructures have emerged including wireless networks. As the quantity, speed, and complexity of networked systems have increased, corresponding network problems emerge. Typically, introduction of a dedicated, stand-alone, diagnostic device to the network commonly known as a network traffic analyzer can facilitate resolving network problems.

In general, a network traffic analyzer obtains key information about network traffic parameters and is capable of capturing and recording such data to provide a permanent record of communications on the network bus. Network traffic analyzers are capable of being controlled to begin and/or end recording based on the presence of certain conditions. Traditionally, a network traffic analyzer is a separate, dedicated piece of support equipment. Network traffic analyzers are generally PC based or are a specialized instrument and require specific network interface hardware and software modules to adapt to a particular network standard or configuration. Often the network should be analyzed and the diagnostic information collected while the network is being utilized by users in a live environment. Trouble-shooting network problems requires configuring a network traffic analyzer with an appropriate network interface module and associated software.

Moreover, in the industrial environment manufacturers typically require collection, analysis, and optimization of real time data from a plurality of sites that are located globally. One common solution for recording such data includes providing a local recording module(s) that often occupies a slot(s) in a control system's backplane, or which resides in another network. For example, a device(s) that acts as a historian(s) can communicate with controllers directly through the backplane, or can communicate remotely via a network interface. In addition, such historian can enable archiving data from the controller to an Archive Engine which provides additional storage capabilities.

In distributed control systems controller hardware configuration can be facilitated by separating the industrial controller into a number of control elements, each of which can perform a different function. Particular control modules needed for the control task can be connected together on a common backplane within a rack and/or through a network or other communications medium. Various control modules can also be spatially distributed along a common communication link in several locations. Such modular construction can further accommodate different applications that require various numbers and types of input/output (I/O) circuits, as can be determined by the particular device or process being controlled. Such stored control program runs in real-time to provide outputs to the controlled process (e.g., electrical signals to outputs such as actuators and the like.)

Data can be communicated with these remote modules over a common communication link, or network, wherein any or all modules on the network communicate via a common and/or an industrial communications protocol. Controllers within a control system can communicate with each other, with controllers residing in other control systems or with systems or applications outside of a control environment (e.g., business related systems and applications). Accordingly, management processes; such as diagnostic/prognostic measures for failure control, are becoming increasingly complex.

Moreover, in such environments, analysis and collaboration typically require interaction of two information streams, namely "internal" data (which is collected from an industrial unit(s), such as via historians, log collectors, and the like), and "external" data (which is associated with data traffic for network services.) In conventional systems, such two information streams are collected independently and analyzed separately—e.g., a first set of devices/analyzers collect internal data from the modules/units, and a second set of devices/analyzers gather data on network traffic. In general, available relation ships (e.g., timing relationships, sequence counting, and the like) between such two data streams are not readily apparent and are often deduced manually, hence adding to system inefficiencies. Moreover, in conventional systems, such two information streams are not synchronized together, and their collection does not depend on criticality of collection stage.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject innovation provides for systems and methods that vary a data sampling rates of various sets of data via a sample rate adjustment component, to collect data with different levels of granularity for an industrial system. By varying the collection rate of different sets of data, data or set of data can be collected at desired rate, wherein particular data, or sets of data, can be eliminated, or filtered out, from collection by setting their collection rates to zero.

The various data or data sets for such an industrial system can include data from the "internal" data stream(s) (e.g., history data collected from an industrial unit, automation or process data, and the like) and "external" data stream(s) (e.g., traffic data on one or more networks, communication data and the like), wherein data can be collected based in part on the criticality/importance criteria assigned to each collection stage. For example, a higher sample rate can be employed when collecting data from the network during an operation stage that is deemed more critical (e.g., dynamic attribution of predetermined importance factors) than other stages of the operation. The sample rate adjustment component can communicate with controllers directly through the backplane, or can communicate remotely via a network interface, wherein such communications can employ hard wired or wireless protocols.

In a related aspect, a coordination component can collect and analyze both the "internal" data stream(s) and the "external" data stream(s) simultaneously. It is to be appreciated that each of such data streams can further include a plurality of data streams that are associated with the industrial automation system. The coordination component can synchronize and maintain timing and sequence relationships between events and network traffic, hence readily evaluating/determining a correlation or causal relationship between seemingly random events within the plurality of streams, for example. Similarly, such coordination component can synchronize and maintain timing and sequence relationships between events in a plurality or mix of internal and external data streams, hence readily evaluating/determining a correlation or causal relationship between seemingly random events within a plurality of data streams, some of which have impact on the events and others which do not. The coordination component can further initially weave data records together (e.g., based on sequence relationships, time stamps), and subsequently presents such interrelated data to a user based on predetermined levels of data granularity (e.g., nano-second interval, milli-second interval), as indicated by sample rate adjustment component. In a related aspect, a matching component can subscribe modules/industrial zones with predetermined triggering events within such synchronized industrial setting. Data can subsequently be displayed to users based on defined zones and/or event triggers.

According to a further aspect, the automated industrial system of the subject innovation can include a recognition component that analyzes both the "internal" data stream(s) and the "external" data stream(s), to identify patterns in data trends that affect industrial processes. Such pattern identification can be based on: predetermined scenarios (e.g. comparison of operation status for the industrial plant with quality of previous batch out comes), and/or interpreting control programs that are routinely updated. The recognition component can further employ explicit correlations (e.g., predetermined models that are set by a user/external data sources), and/or implicit correlations that are dynamically deduced among events/possible causation links.

In addition, a centralized, or distributed, data collection system that exploits synchronization capabilities between history data (e.g., internal logs of units) and network traffic analyzer data, can form a unified repository of data (e.g., a single log file in compressed format, binary data in flat file, various forms of databases, and the like). Accordingly, history data can be persisted for future prognostic diagnostic trouble shooting events, wherein data resources are not burdened at a display level (e.g., unscrambling data at required granularity levels), and not at the collection stage. Such centralized data collection system associated with the dual information streams can selectively decay stored data (e.g., a gradual purge) based on data importance, likelihood of use, and the like. Accordingly, interfacing with the network can be facilitated, wherein various configurations of a network interface for ControlNet, DeviceNet, Ethernet, Wireless networking, and the like can be employed To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
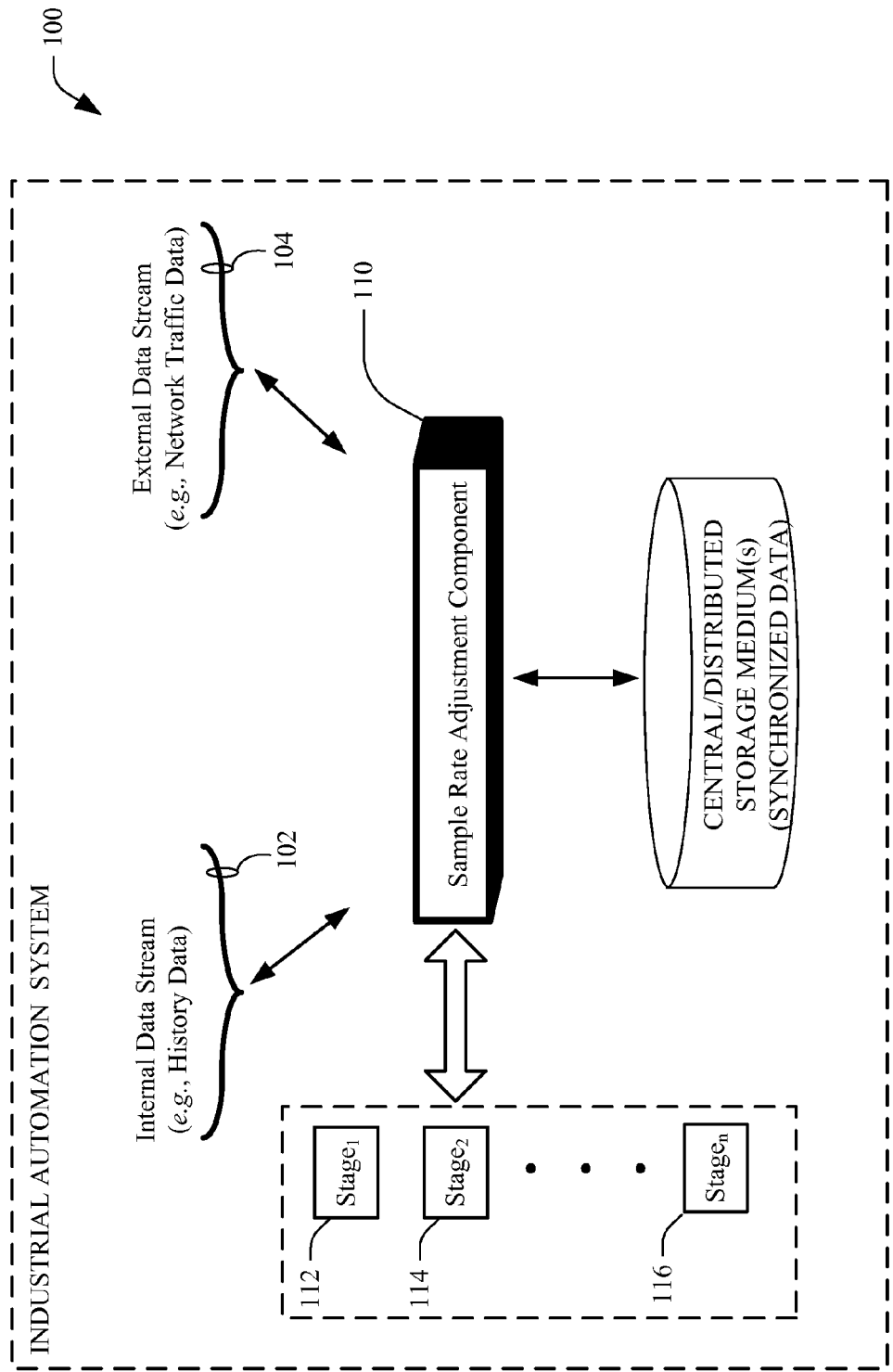
FIG. 1 illustrates a schematic block diagram of a sample rate adjustment component for an industrial system in accordance with an aspect of the subject innovation.

FIG. 1 illustrates a sample rate adjustment component 110 that collects sets of data with different levels of granularity for an industrial system. The data sets for such industrial system 100 includes data sets from the "internal" data stream 102 (e.g., history data collected from an industrial unit) and an "external" data stream 104 (e.g., traffic data on network services). By varying the collection rate of different sets of data, any data or set of data can be collected at any rate. Furthermore, certain data, or sets of data, can be eliminated, or filtered out, from collection by setting their collection rates to zero.

The sample rate adjustment component 110 can vary a data collection rate based in part on the criticality/importance criteria assigned to each collection stage. For example, a higher sample rate can be employed when collecting data from the network during an operation stage that is deemed more critical (e.g., dynamic attribution of predetermined importance factors) than the rest of the operation.

Such rate adjustment component 110 can adjust sampling rates of data collected from both the internal data stream 102 and external data stream 104, wherein different level of granularity for data collection can be employed at various stages 112, 114, 116 of an industrial process. Put differently, the sample rate adjustment component 110 can vary a data sampling rate, in part in response to fault detection, alert triggering, and the like. Accordingly, future trouble shooting efforts can be performed with respect to data that is typically collected at an adjustable sample rate. For example, a higher sample rate (than sample rate during normal operation) can be employed when collecting data from an operation stage that has experienced a fault or critical alert trigger. The rate adjustment component 110 can also be associated with embedded historians to supply a direct interface to controllers without employing a transitional layer, and hence provide a substantially higher data exchange rate as compared to conventional historians, for example. Likewise, the sample rate adjustment component 110 can communicate with controllers directly through the backplane, or can communicate remotely via a network interface. It is to be appreciated that while only a single external data stream 104 and internal data stream 102 are illustrated, the subject innovation is not so limited, and a plurality of such streams can be accommodated.

Figure 2:
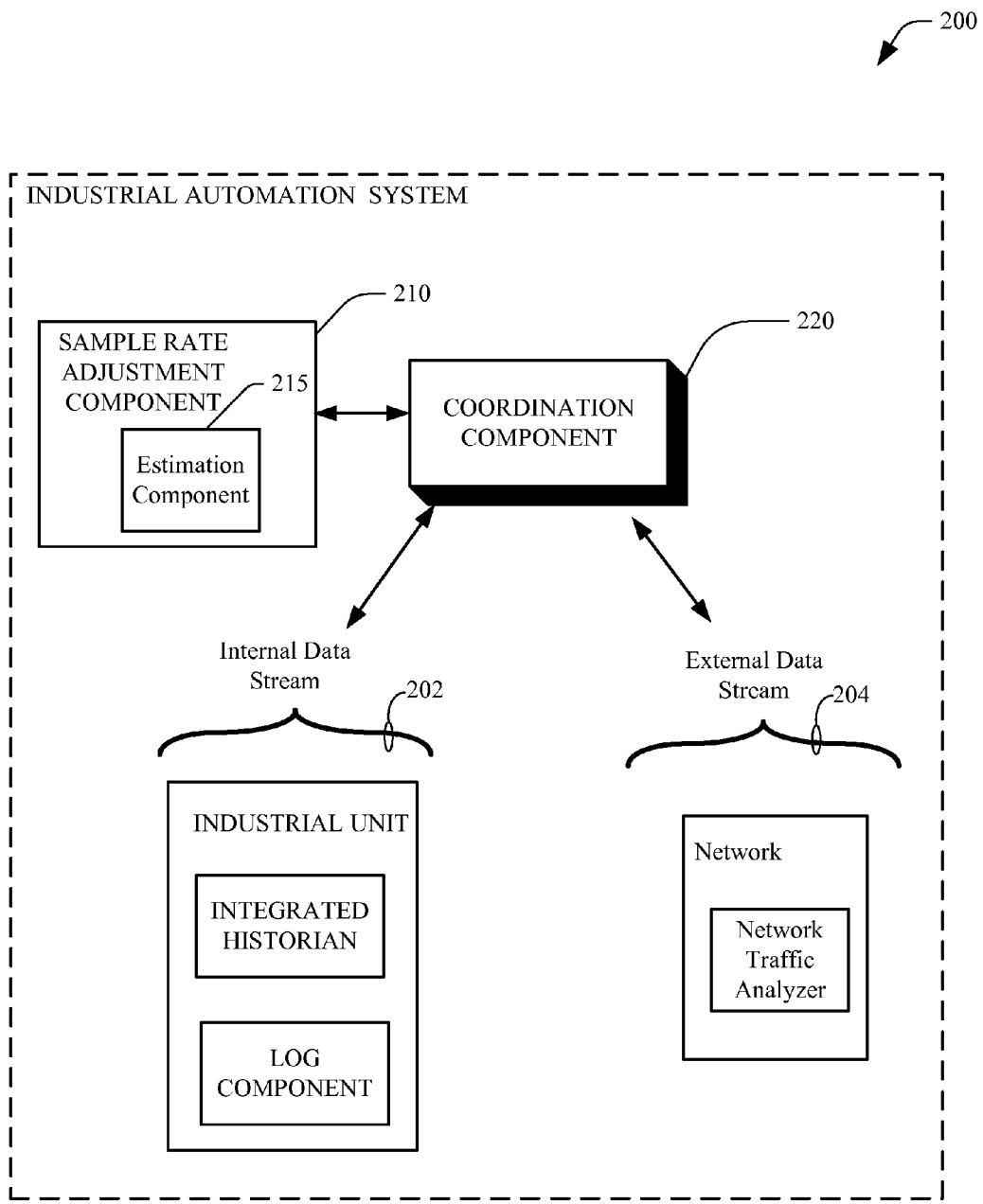
FIG. 2 illustrates a block diagram of a coordination component that facilitates data collection and management processes for the industrial system of the subject innovation.

FIG. 2 illustrates a coordination component 220 can collect and analyze both the "internal" data stream 202 and the "external" data stream 204 simultaneously. Such coordination component 220 can synchronize and maintain timing and sequence relationships between events and network traffic, hence readily evaluating/determining a correlation or causal relationship between seemingly random events within the two streams 202, 204. It is to be appreciated that such synchronization and maintaining of timing and sequence relationships can also occur between, multiple internal data streams, multiple external data streams, and the like. Moreover, the data streams can include data related to controller alarms, events and audit, wherein alarm and events in such data stream can further be correlated to a change in the system.

The coordination component 220 can further initially weave data records from the internal data stream 220 and the external data stream 204 together (e.g., based on sequence relationships, time stamps), and subsequently presents such interrelated data to a user based on predetermined levels of data granularity (e.g., nano-second interval, milli-second interval), as indicated by the sample rate adjustment component 210.

According to a further aspect of the subject innovation, the sample rate adjustment component 210 can further include an estimation component 215 that can automatically predict a required sampling rate for a stage of an operation, based on statistical models and data collected for similar operations and/or history data. For example, a crude model can be constructed for an initial subset of the data using earlier/prior collected data from similar processes. Such allows statistical information to be gleaned from extremely large sets of distributed information relate to similar industrial operation. The model can then be evaluated and/or altered via feedback (e.g., user input). Each model can be programmed to be evaluated for the sampling rate periodically, or upon occurrence of an event (e.g., an alarm trigger, receipt of an e-mail notification message, and the like). Various artificial intelligence systems/methodologies can also be employed to facilitate estimation/prediction of the data collection rate (e.g., sampling rate.)

Figure 3:
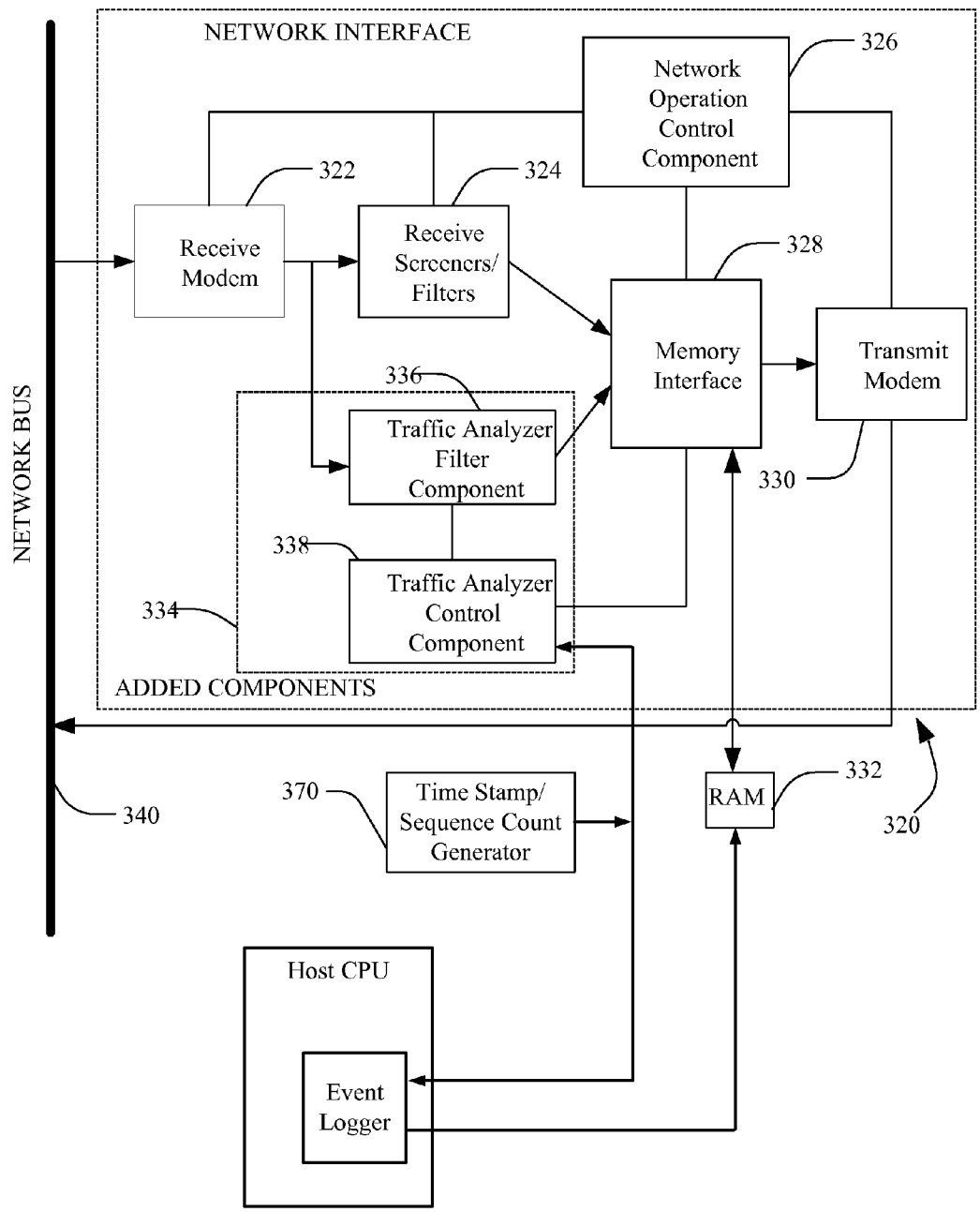
FIG. 3 illustrates a network interface with an embedded network traffic analyzer that can interact with the rate adjustment component of the subject innovation.

FIG. 3 illustrates a network interface 320 with an embedded network traffic analyzer that can interact with the rate adjustment component of the subject innovation. In general, many embedded devices have an event logging mechanism to track interesting and/or anomalous behavior within the device, wherein such event information can be downloaded to a PC for evaluation and analysis when a problem occurs. Likewise, many communication and control networks have traffic analyzer capability that allows network traffic to be captured by or downloaded to a PC for evaluation and analysis when a problem occurs.

As explained earlier, in traditional systems such two information streams are gathered separately, usually using different pieces of equipment and software. Once gathered, conventionally they are analyzed separately and timing relationships between events in the log and network traffic is implied and should be determined manually (if possible to do so). FIG. 3 illustrates the relationships between: the network interface that implements the traffic analyzer functionality, the host CPU that implements the event logging functionality, the shared TimeStamp/Sequence Count Generator, and the external RAM that holds both the Traffic Analyzer (TA) data and event log data. The coordination associated with the industrial system of the subject innovation can gather both the event log and network traffic data streams and coordinate their relationships via a common timestamp/sequence count generator 370. Such coordination maintains the timing and sequence relationships between events and network traffic, providing a mechanism for determining cause and effect between the two data streams. Put differently, both the event logger and traffic analyzer share a common timestamp/sequence count generator to tag the individual pieces of data collected. By tagging the data with a common set of identifiers as it is collected, the sequence of what occurred can be recreated by application software in a PC even if the event log and traffic analyzer data streams are gathered and uploaded independently, for example. Furthermore, data streams uploaded from multiple modules can be coordinated, provided that the timestamp/sequence count generators are synchronized (e.g. via IEEE 1588).

Network interface 320 can include various components that implement standard network interface protocol along with additional components required to implement an embedded network traffic analyzer in accordance with an aspect of the subject innovation. The standard components can include a receive modem 322, a receive screeners/filters 324 (or addresses for Ethernet), a network operation control component 326, a memory interface 328 and a transmit modem 330, for example. The receive modem 322 can be coupled to the network bus 340 to receive signals transmitted onto the network bus by other devices. Similarly, the transmit modem 330 can be coupled to a network bus 340 to transmit signals to the network from the device containing the network interface. Although the receive modem 322 and transmit modem 330 are illustrated as separate components, it is understood that both components can be implemented in a single transceiver component capable of both transmitting and receiving information to and from the network bus. The receive modem 322 can be coupled to the receive screeners/filters 324. The receive screeners/filters 324 determine whether the information placed on the network is intended for this particular device. Each device on the network is typically assigned a unique identifier. The receive screeners/filters 324 recognize the unique identifier and determine whether the information on the network is intended for the respective device. The receiver screener/filter 324 can further be coupled to the receive modem 322, the network operation control component 326 and the memory interface 328. Once determined that the data on the network is intended for the device in question, then the network operation control component 326 interprets and responds to the information accordingly. The memory interface 328 is coupled to receive screeners/filters 324, normal operation control component 326, transmit modem 330, and external random access memory (RAM) 332. Although the RAM 332 is illustrated as being external to the network interface, it is understood that the RAM can be implemented internally as well, or RAM 332 can be implemented as a combination of both internal memory and external memory. As direct by network operation control component 326, memory interface 328 uploads data from RAM 332 or downloads data to RAM 332 as necessary. Data is then passed as necessary from RAM 332 through memory interface 328 to transmit modem 330 and onto the network or from the receive screeners/filters 324 and through the memory interface 328 and into RAM 332.

The network interface 320 with embedded network traffic analyzer can be implemented as an Application Specific Integrated Circuit (ASIC). The particular makeup of the components of the ASIC varies in accordance with the requirements for the intended network standard and protocol. Although illustrated as being implemented in an ASIC, it is understood that the present invention can be implemented with standard integrated circuits, discreet components, more than one ASIC, a combination thereof, or in any manner which replicates the required function and the present invention is intended to encompass all such configurations. It is to be appreciated that FIG. 3 is exemplary in nature, and other implementations such as an external device that contains an external analyzer device can be connected to the network.

By adding the additional components 334 to the network interface, any suitable device comprising the network interface with the additional components can be employed as a network traffic analyzer. The additional components 334 are comprised of traffic analyzer filters component 336 and traffic analyzer control component 338. Data on the network is received by the receive modem 322 and passed to the traffic analyzer filters component (not shown).

Such traffic analyzer filters component can include for example, a source media access control (MAC) identifier (ID) filter component, a destination MAC ID filter component, a packet type filter component (scheduled, unscheduled, etc.), and other filter components to capture information pertinent to the network protocol, or IP addresses/broadcast addresses for Ethernet scenarios. For example, such other filter components can include, a sequence number filter component, a packet length filter component, a checksum data component, and typically any other information pertinent to the given network protocol. The combination of all the filters allow the network interface to determine which device is the source of data being transmitted, which device is the destination for the data being transmitted, the type of information being transmitted, the length of the data being transmitted and other information pertinent to diagnosing network problems. Control of the network traffic analyzer is accomplished by the traffic analyzer control component 338. Such traffic analyzer control component 338 can further include a monitoring component, a collection start/stop component, a memory configuration and status component, and a memory upload/download component. The monitoring component monitors the normal device operations to determine available processor and memory access bandwidth which can be utilized for network traffic analyzer functions. The collection start/stop component determines conditions for which data collection will start and stop. Start and stop conditions can be triggered by many different conditions including, but not limited to, time, duration, presence of a particular condition, packet type, or data or absence of a particular condition, packet type or data. The memory configuration and status components along with the memory upload/download components help control the management of collected data to and from memory.

The added components can include hardware and firmware to fulfill the operation as an embedded network traffic analyzer. The added firmware includes an interface to the network traffic analyzer. The additional firmware comprises necessary information for the particular network including filter configuration, memory configuration an associated status, collection start and stop, and network traffic analyzer memory upload. With the additional hardware and firmware components, the interface device can start and stop collecting, recording and analyzing data in accordance with a prescribed set of conditions.

Figure 4:
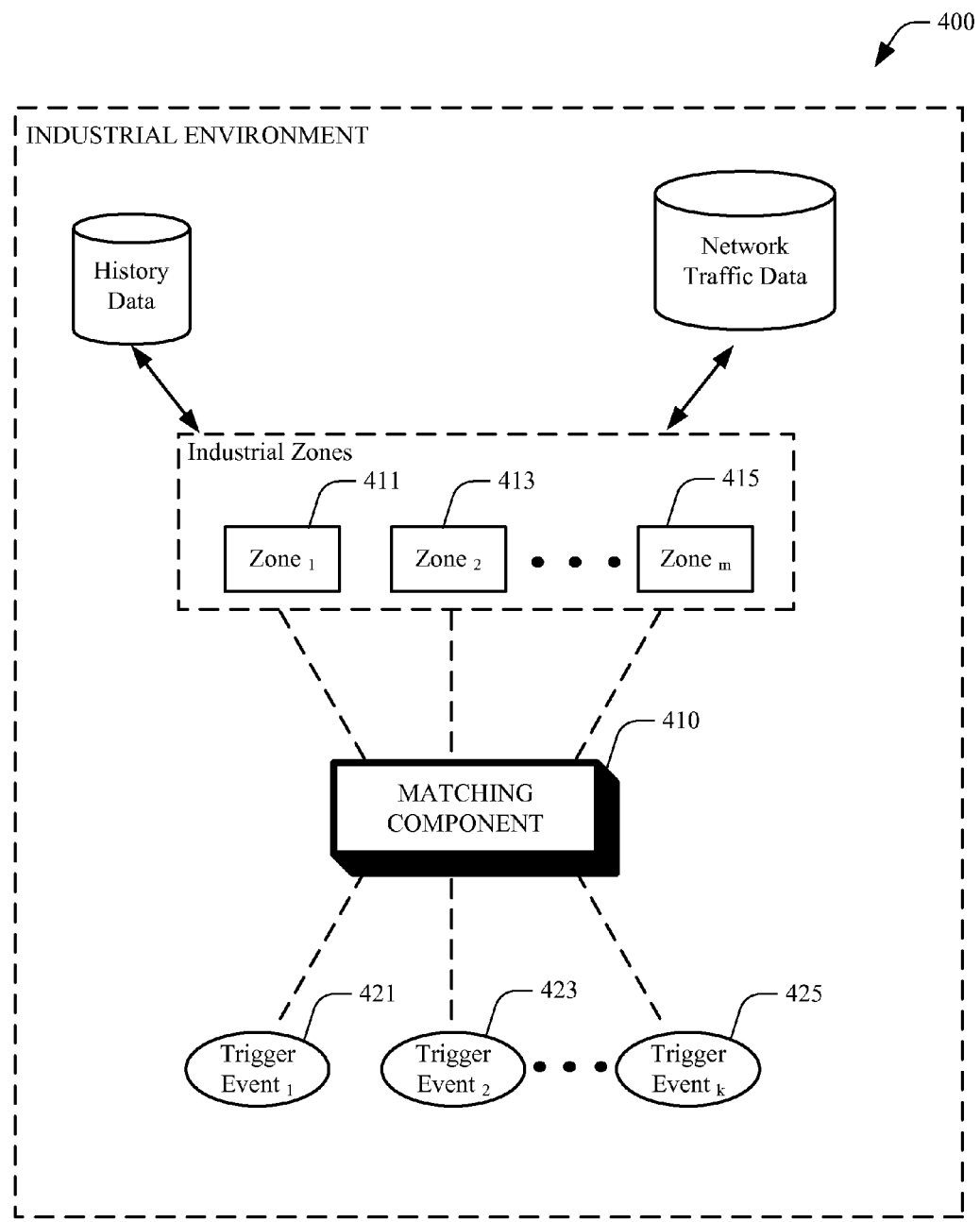
FIG. 4 illustrates a matching component as part of an industrial system of the subject innovation.

FIG. 4 illustrates a matching component 410 as part of an industrial system 400 of the subject innovation. A matching component 410 can subscribe modules/industrial zones with predetermined triggering events within such synchronized industrial setting, to adjust the data sampling rate based on triggering events for different zones. Data can subsequently be displayed to users based on defined zones and/or event triggers. The industrial zones 411, 413, 415 can be designated and/or identified zones within an industrial automation environment 400. Any number of zones (1 to m, wherein m is an integer) can be designated for zone recognition, and each of such zones 411, 413, 415 can be any shape, size, etc. and/or can be associated with any machine, process, as part of the industrial system—wherein each zone can remain static at all times, change over time, and the like.

The triggering event 421, 423, and 425 (1 to k, k being an integer) can include events such as; receiving a message to execute a particular functional block, locating data input for a functional block, executing a predetermined order for the functional block, and the like, for example. In a related aspect, rate of data collection can automatically start at onset of activities relating to a function block by the triggering event. Likewise, data collection can automatically stop upon completion of the function block. Accordingly, relevant data to various performance stages can automatically be gathered, even though users (e.g., unit operators, plant engineers) may not necessarily know what data is important to collect for addressing future trouble-shooting.

Figure 5:
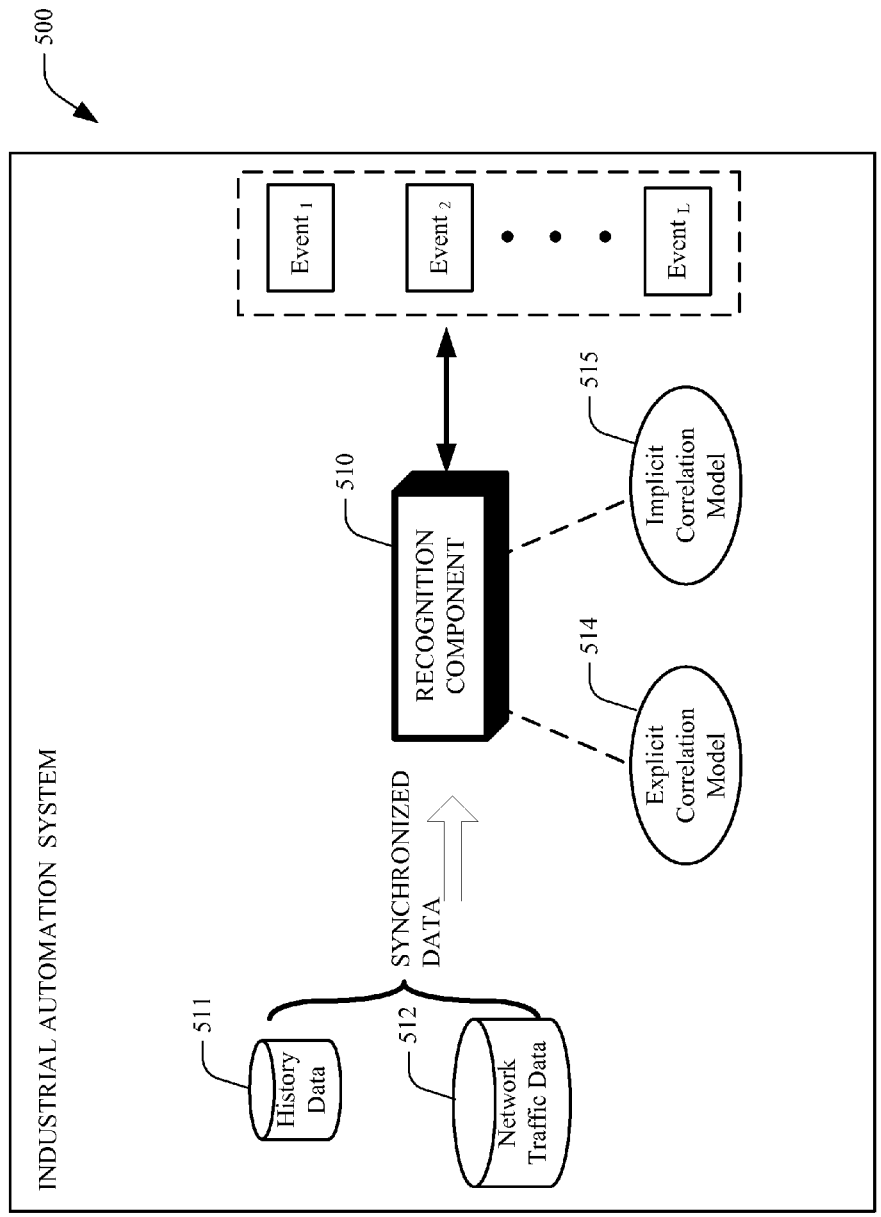
FIG. 5 illustrates a recognition component that identifies patterns in data trends that affect an industrial process in accordance with an aspect of the subject innovation.

FIG. 5 illustrates an industrial system 500 in accordance with an aspect of the subject innovation, which further includes recognition component. The recognition component 510 identifies patterns in data trends that affect an industrial process in accordance with an aspect of the subject innovation. Moreover, the recognition component 510 can analyze both the "internal" data stream 511 and the "external" data stream 512, to identify patterns in data trends that affect industrial processes. Such pattern identification for events (1 to L, where L is an integer) can be based on: predetermined scenarios (e.g. comparison of operation status for the industrial plant with quality of previous batch out comes), and/or interpreting control programs that are routinely updated. The recognition component 510 can further employ explicit correlations 514 (e.g., predetermined models that are set by a user/external data sources), and/or implicit correlations 515 that are dynamically deduced among events/possible causation links.

Figure 6A:
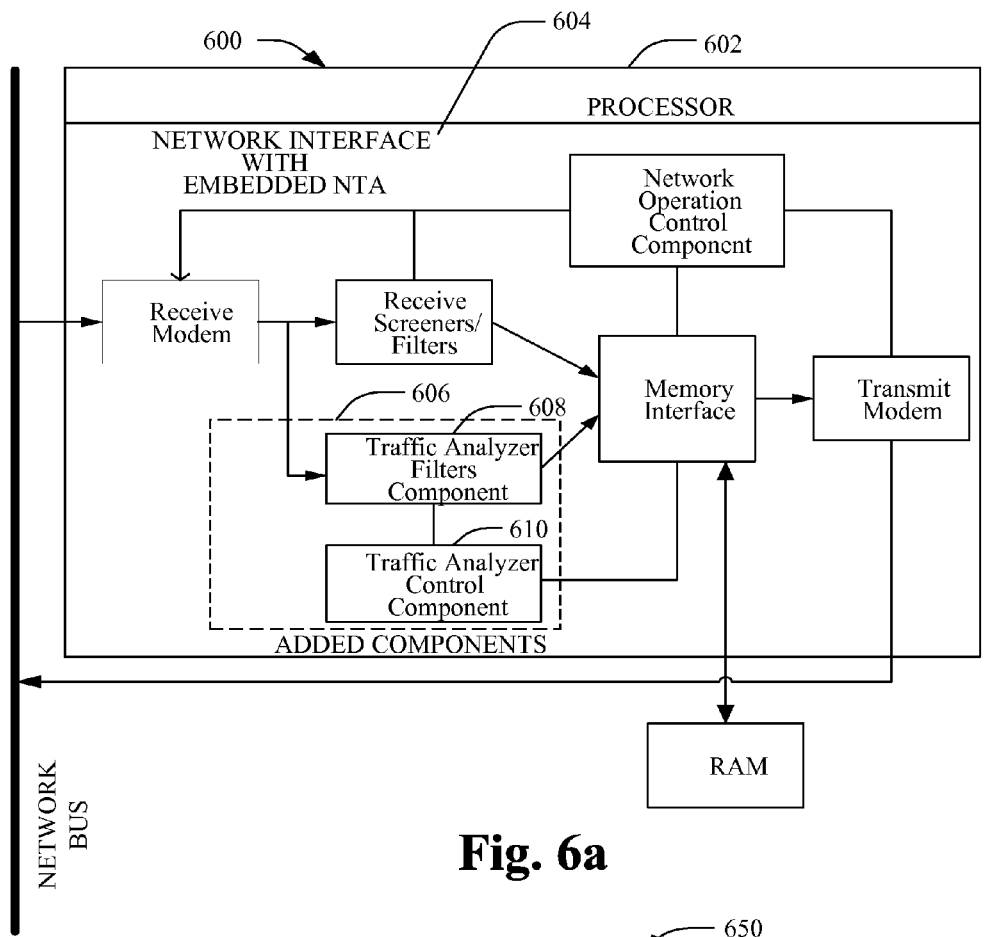
FIGS. 6a & 6b illustrate an industrial system in accordance with an aspect of the subject innovation with an embedded network analyzer.
Figure 6B:
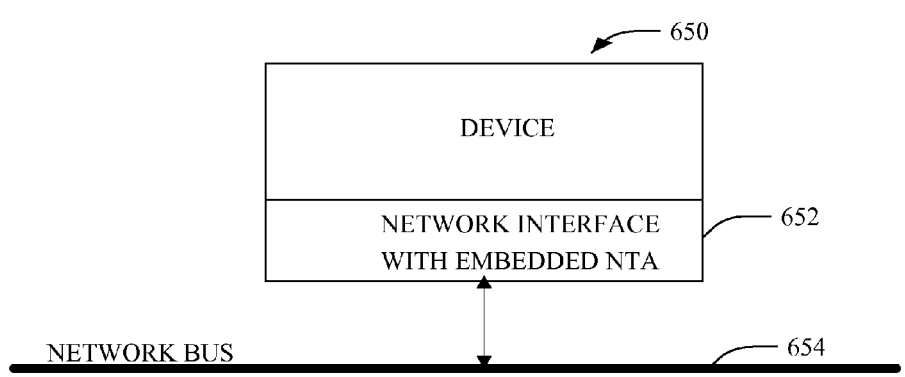

FIG. 6a illustrates an industrial system in accordance with an aspect of the subject innovation, which employs an embedded traffic network analyzer—wherein by adding the added components to a device with a network interface, the device is configurable as a network traffic analyzer. The system 600 includes a processor 602 and a network interface 604 with an embedded network traffic analyzer 606 in accordance with the subject innovation. The embedded network traffic analyzer 606 can further include a traffic analyzer filter component 608 and traffic analyzer control component 610, both hardware and associated firmware. When connected to a network, the device will function as a network traffic analyzer for the network to which it is connected. Such is illustrated in FIG. 6b where device 650 includes a network interface with embedded network traffic analyzer 652 is coupled to a network 654. The device 650 can be a standard PC, a network printer, a network scanner, or any device with a network interface to which the network traffic analyzer components have been added. In accordance with one aspect of the invention, the device 650 can be operated in different modes. For example, in one mode the operation of device 650 is dedicated to a normal function (e.g. a PC, printing, scanning, etc.). In another mode the device 650 can operate as a dedicated network traffic analyzer. While in yet another mode, the device 650 combines its normal function(s) with network traffic analyzer functionalities. In such mode, priority is generally given to the devices' normal operation; the network traffic analyzer functions can utilize excess device resources such as processor and memory bandwidth. In any mode, complex sorting and searching tasks can be performed at a later point in time, for example as post processing operations on a computer comprising the subject innovation, or the data gathered by the device can be transferred via the network to another processor for post processing and analysis.

Figure 7:
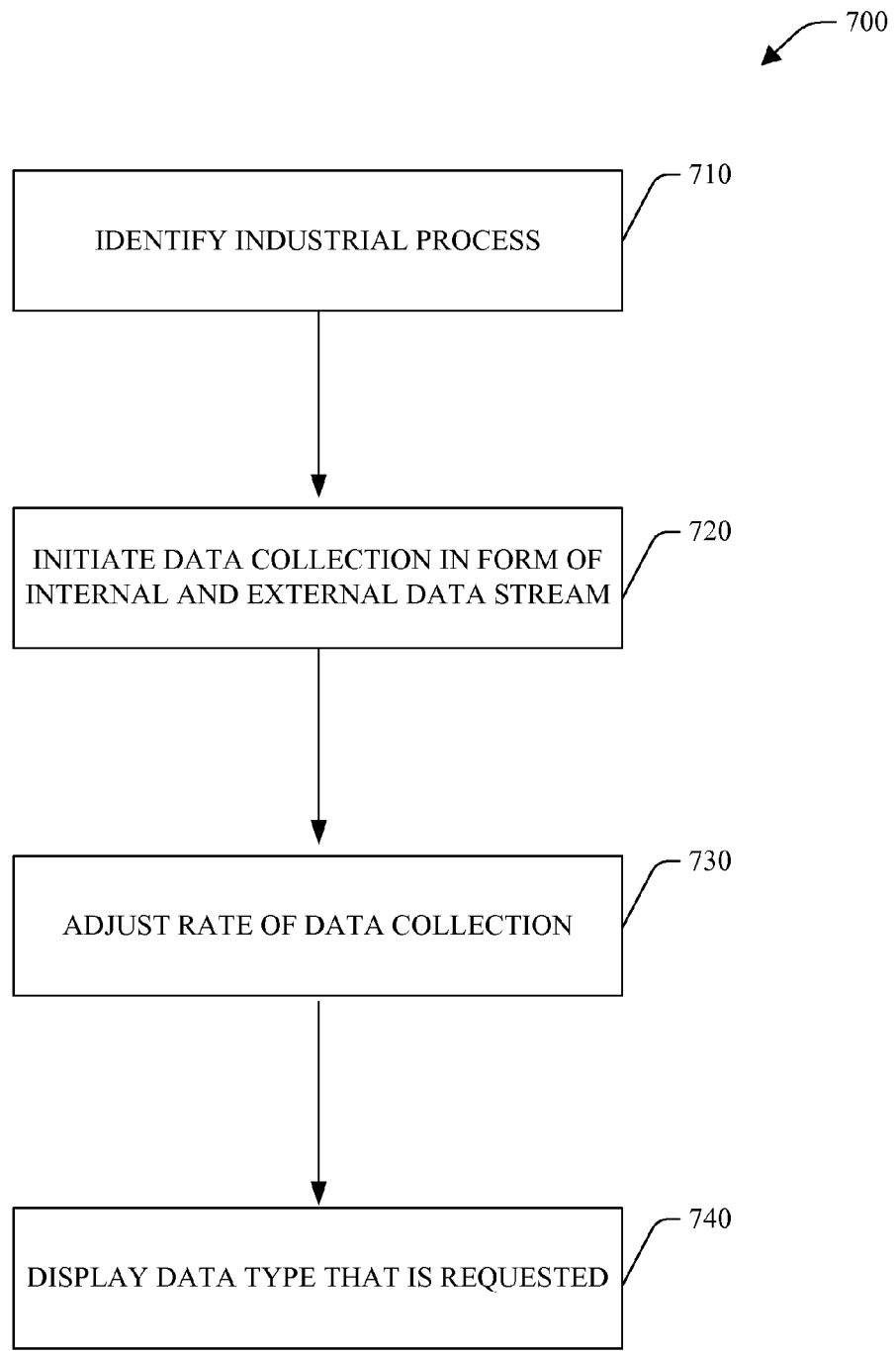
FIG. 7 illustrates a related methodology of adjusting a sampling a rate in accordance with a particular aspect of the subject innovation.

FIG. 7 illustrates a related methodology 700 of gathering data based on a plurality of granularity levels for the industrial process. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially, and at 710 an industrial operation for which data collection is required can be identified. Such data is typically collected at 720 in form of collection in form of an internal data stream and external data stream simultaneously, wherein such data streams can be synchronized, to maintain timing and sequence relationships between events and network traffic. Next, and at 730 rate of data collection can be adjusted based on desired level of granularity. For example, a higher sample rate for data collection (than sample rate during normal operation) can be employed when collecting data from an operation stage that is deemed more critical than the rest of the operation. As the industrial system of the subject innovation initially weave data records together (e.g., based on sequence relationships, time stamps), and subsequently presents such interrelated data to a user based on predetermined levels of data granularity (e.g., nano-second interval, milli-second interval), wherein at 740 desired data can be displayed to a user.

Figure 8:
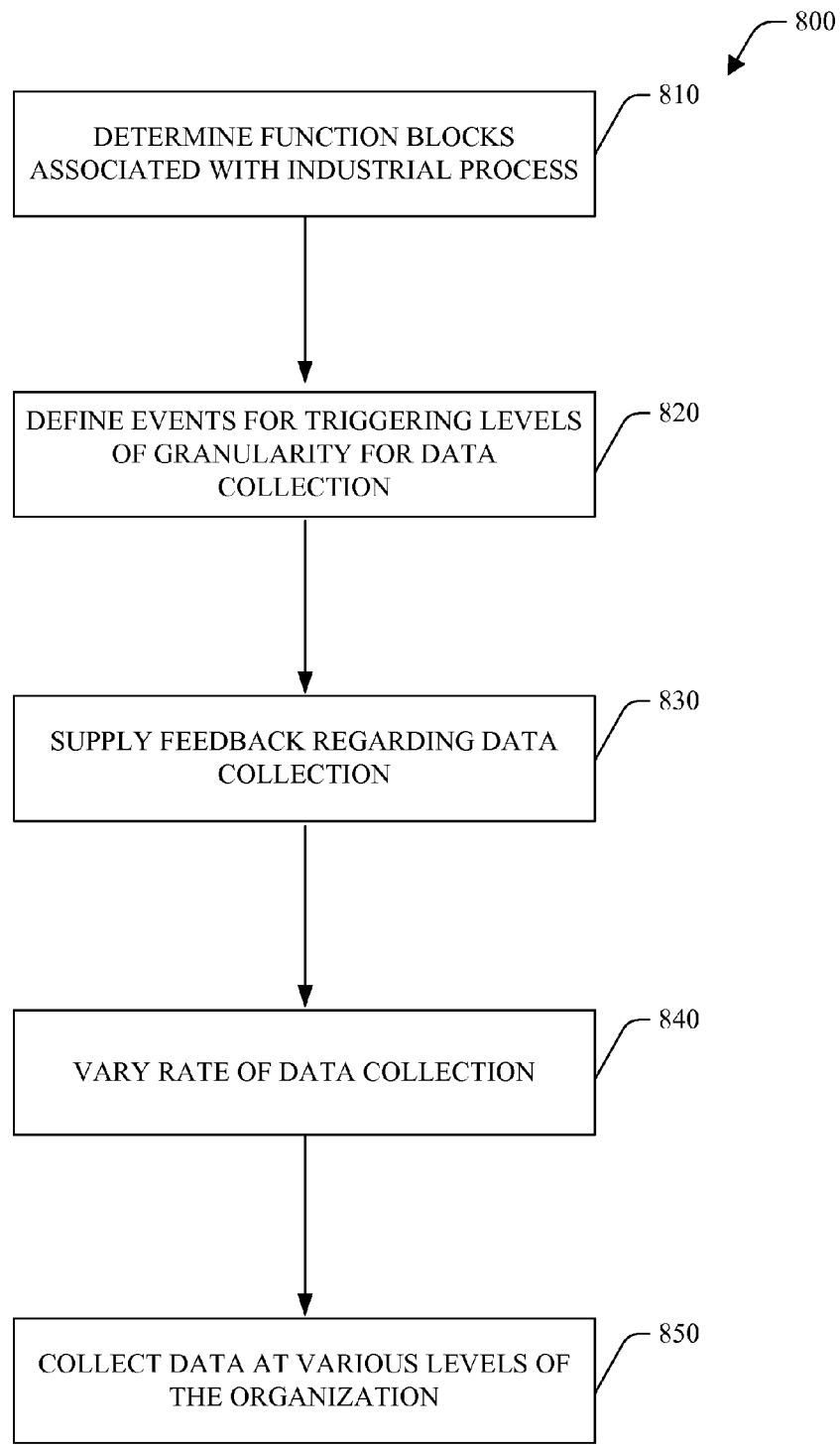
FIG. 8 illustrates a further methodology for a rate adjustment component in accordance with an aspect of the subject innovation.

FIG. 8 illustrates a further methodology 800 in accordance with a further aspect of the subject innovation. Initially, and at 810 various function blocks that are associated with such industrial process can be determined. In general, such function blocks can pertain to a control strategy, which can be downloaded to one or more control modules in the control system. Moreover, the control functions represented by the function blocks are implemented in the verified control routine according to execution ordering which may be determined in the compilation or verification process in the configuration tool.

A plurality of triggering events can subsequently be defined at 820 that correspond to execution of a particular granularity of data collection associated with such function blocks. For example, such triggering event can be based on an execution order, data importance, likelihood of use, and the like, to collect data from both an internal data stream and an external data stream. Next, and at 830 feedback can be provided (e.g., a plant engineer, operator) regarding efficiency of such data collection. Based on such feedback, and/or based on predetermined criteria (e.g., data criticality for future trouble shooting) a rate for data collection can be varied, at 840. Next and at 850, data collection from the internal data stream and external stream can proceed based on such adjusted rate of data collection. As explained earlier, it is to be appreciated that while two data streams are described in FIG. 8 and FIGS. 9a & 9b, multiple data streams can also be employed for analysis utilizing the aspects of the subject innovation. Moreover, while the subject innovation is primarily described in context of an internal and external data stream, it is to be appreciated that the data streams can also include any combination of: multiple internal; multiple external; internal and external or multiple internal and external data streams.

Figure 9A:
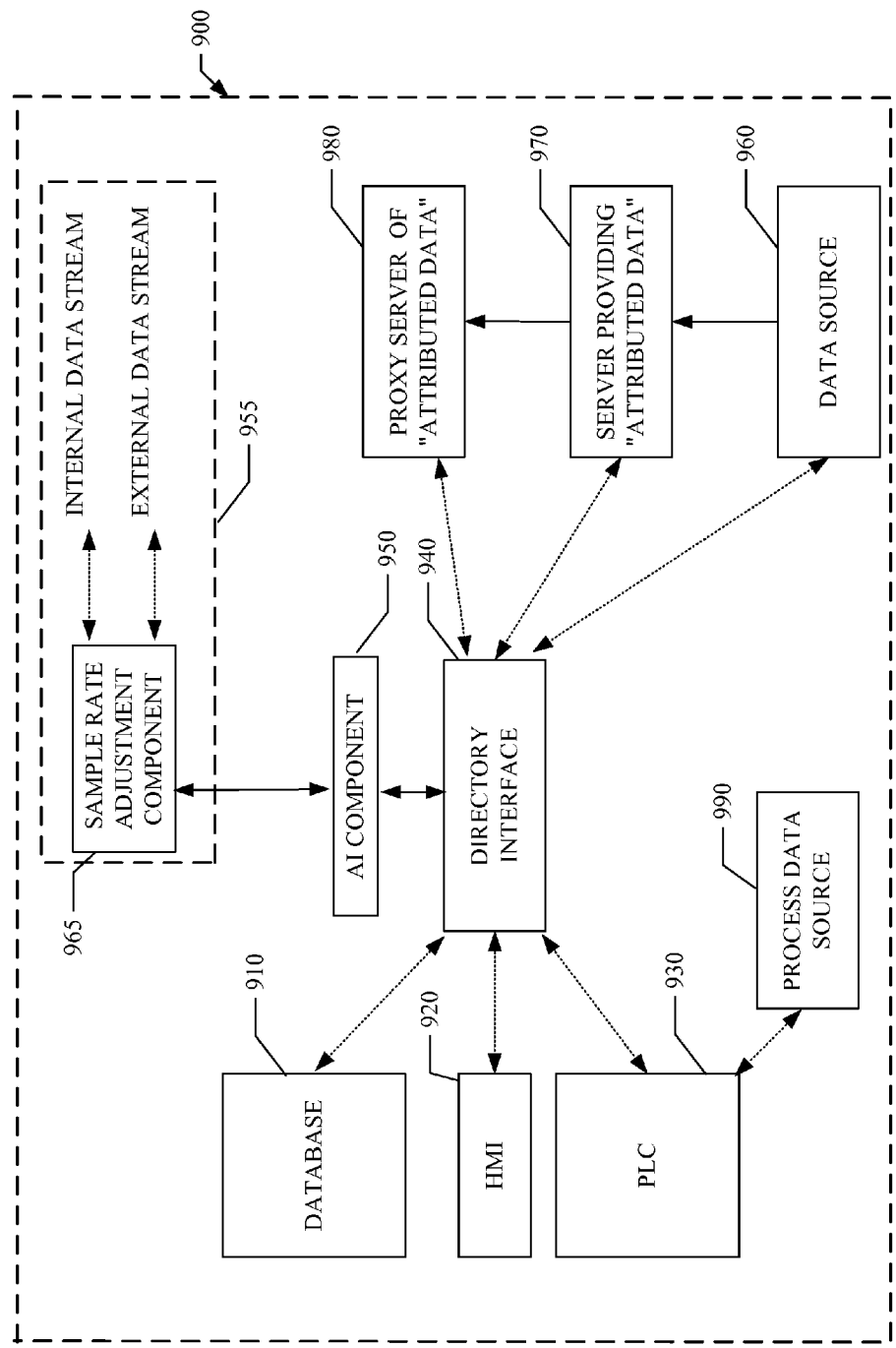
FIGS. 9a & 9b illustrate exemplary industrial automation networks that employ a rate adjustment component to vary a rate of data capture.

FIG. 9a illustrates an exemplary industrial automation network that employs a sample rate adjustment component 965 that configures a rate for data collections, from both the internal data stream (e.g., from embedded historians) and external data stream (e.g., from traffic analyzer). Such sample rate adjustment component 965 can assign a higher rate for data collection (than data collection rate during normal operation), when collecting data from an operation stage that is deemed more critical than the rest of the operation of the industrial setting 900, for example. In one aspect, the sample rate adjustment component can be part of the modules 955. The industrial setting 900 can further include a database 910, a human machine interface (HMI) 920 and a programmable logic controller (PLC) 930, and a directory interface 940, for example. The rate adjustment component 965 can further associate with an Artificial Intelligence (AI) component 950 to facilitate determination of rate for data collection, and accumulation of such history data (e.g., via the embedded historians for the internal data stream.)

For example, in connection with determining a rate collection associated with a control algorithm and/or initiating of data capture, the subject invention can employ various artificial intelligence schemes. A process for learning explicitly or implicitly whether data from a historian should be downloaded, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class). As shown in FIG. 9a, an artificial intelligence (AI) component 950 can be employed to facilitate inferring and/or determining when, where, how to vary a rate of data collection. The AI component 950 can employ any of a variety of suitable AI-based schemes as described supra in connection with facilitating various aspects of the subject invention.

In addition, the directory interface 940 can be employed to provide data from an appropriate location such as the data source 960, a server 970 and/or a proxy server 980. Accordingly, the directory interface 940 can point to a source of data based upon role and requirements (needs) of a requester (e.g., database 910, HMI 920, PLC 930, and the like.) The database 910 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. In this regard, particular ERP applications may require data that has certain desired attributes associated therewith. Thus, in accordance with an aspect of the subject invention, the directory interface 940 can provide data to the database 910 from the server 970, which provides data with the attributes desired by the database 910.

Moreover, the HMI 920 can employ the directory interface 940 to point to data located within the system 900. The HMI 920 can be employed to graphically display various aspects of a process, system, factory, etc. to provide a simplistic and/or user-friendly view of the system. Accordingly, various data points within a system can be displayed as graphical (e.g., bitmaps, jpegs, vector based graphics, clip art and the like) representations with desired color schemes, animation, and layout.

The HMI 920 can request data to have particular visualization attributes associated with data in order to easily display such data thereto. For example, the HMI 920 can query the directory interface 940 for a particular data point that has associated visualization attributes. The directory interface 940 can determine the proxy server 980 contains the attributed data point with the desired visualization attributes. For instance, the attributed data point can have a particular graphic that is either referenced or sent along with the data such that this graphic appears within the HMI environment instead of or along with the data value.

The PLC 930 can be any number of models such as Allen Bradley Logix, PLC5, SLC-500, MicoLogix, and the like. The PLC 930 is generally defined as a specialized device employed to provide high-speed, low-level control of a process and/or system. The PLC 930 can be programmed using ladder logic or some form of structured language or other appropriate language. Typically, the PLC 930 can utilize process data directly from a data source (e.g., process data source 990 or data source 960) that can be a sensor, encoder, measurement sensor, switch, valve and the like. The data sources 990 or 960 can provide data to a register in a PLC and such data can be stored in the PLC if desired. Additionally, data can be updated (e.g., based on a clock cycle) and/or output to other devices for further processing.

Figure 9B:
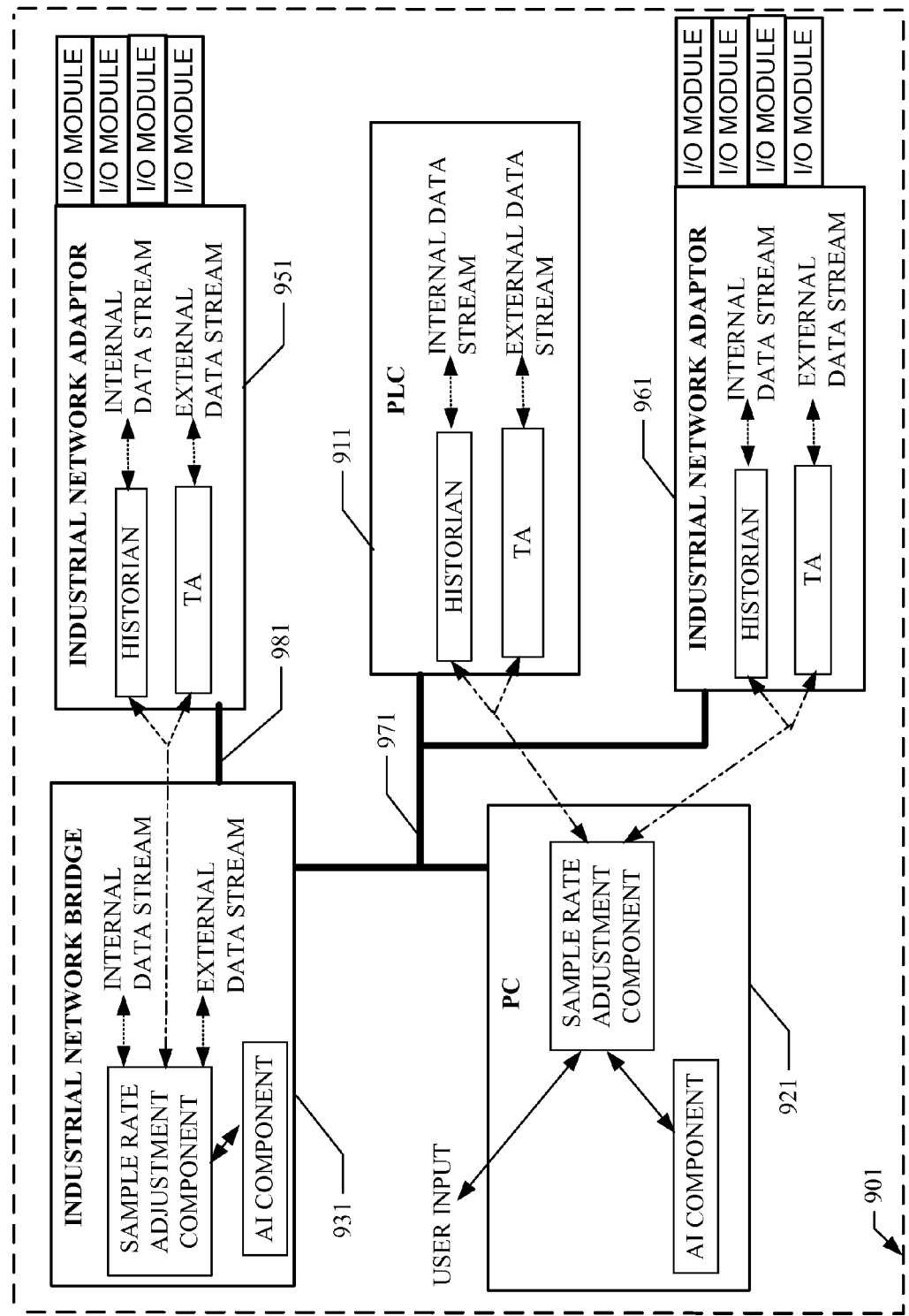

FIG. 9b illustrates a related exemplary industrial setting 901 that can include: a programmable logic controller (PLC) 911, a computer (PC) 921, an industrial network bridge 931 and two industrial network adapters 951 and 961 with their associated I/O modules. Such components/modules can be interfaced together via two industrial automation networks 971 and 981. The sample rate adjustment and AI components can be positioned on one module (e.g., industrial network bridge 931), and control the data collection components of another module (e.g., the historian and traffic analyzer (TA) of industrial network adapter 951. Likewise, the sample rate adjustment and AI components of the PC 921 can control the data collection components of PLC 911 and industrial network adapter 961, for example. It is to be appreciated that the sample rate adjustment and AI components need not be positioned together within the same module/component. Nor do the internal and external data stream collection mechanisms need to be located together within the same module/component. For example, the internal data stream of one module (e.g., a module that has a historian but not a TA) can be correlated with the external data stream of another module that has a TA.

Figure 10:
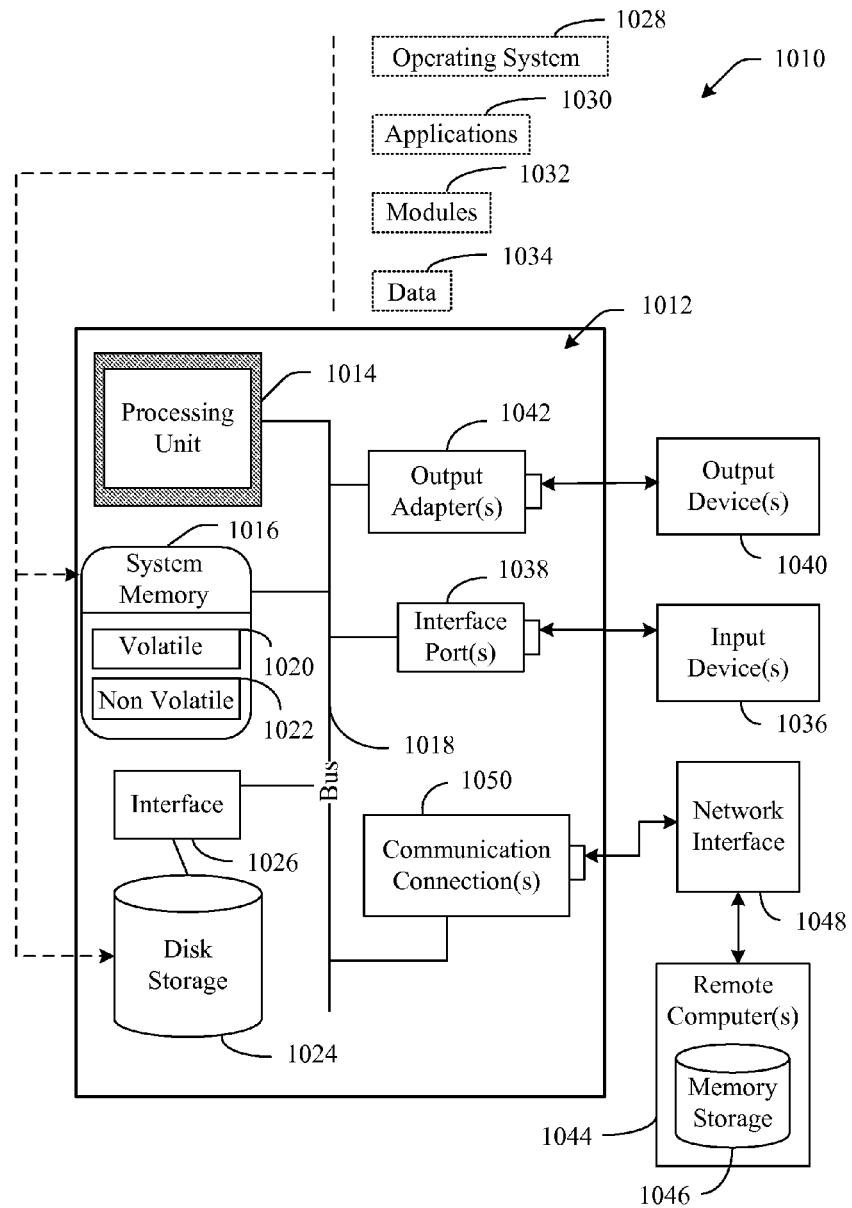
FIG. 10 illustrates an exemplary computing environment that can be employed to implement various aspects of the subject innovation.

FIG. 10 illustrates an exemplary environment 1010 for implementing various aspects of the subject innovation, which can include computer 1012, as part of the rate adjustment component. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), Small Computer Systems Interface (SCSI) or other proprietary bus.

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. For example, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. Moreover, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

As used herein, the terms "component," "system" and the like can also refer to a computer-related entity, either hardware, a combination of hardware and software, software, or software in execution, in addition to electro-mechanical devices. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Figure 11:
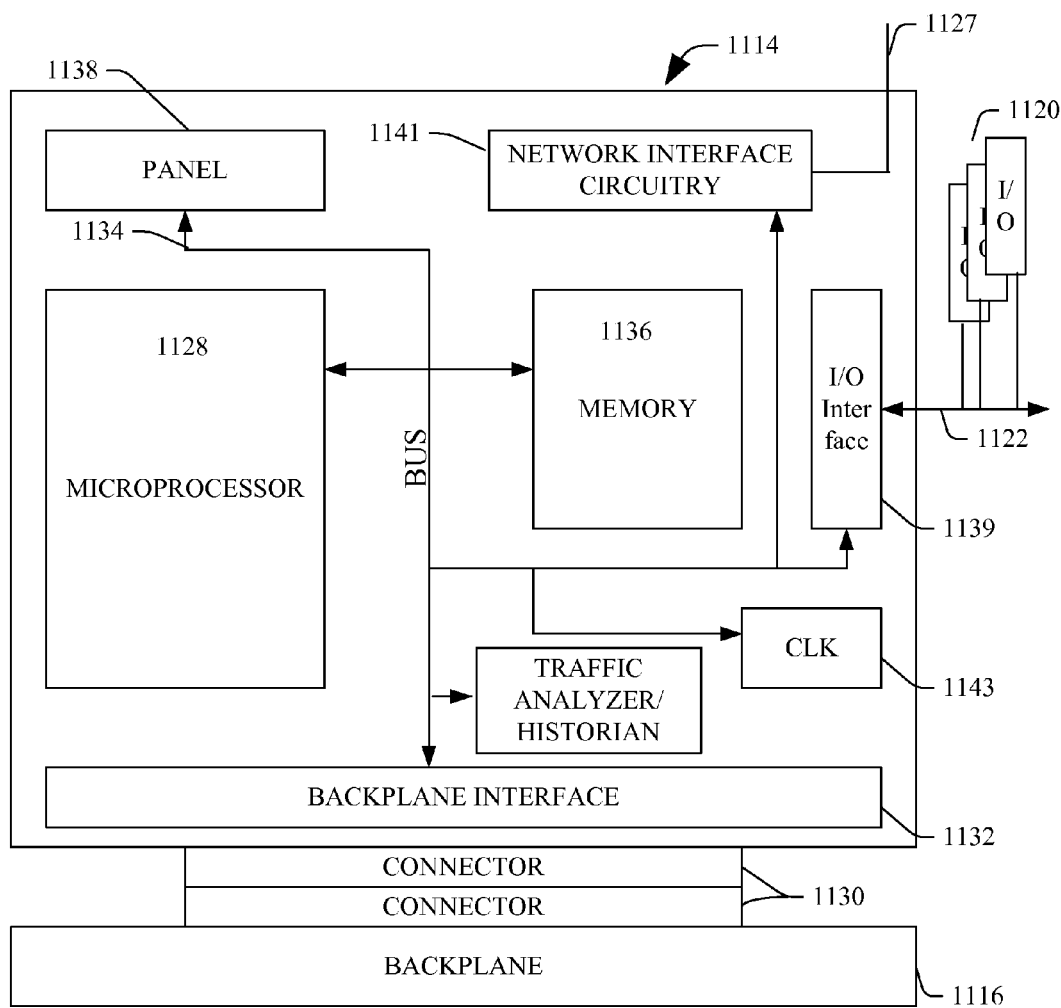
FIG. 11 illustrates an industrial setting with a backplane and associated modules that can employ a rate adjustment component in accordance with an aspect of the subject innovation.

FIG. 11 also illustrates an exemplary environment that can employ a rate adjustment component to collect data in accordance with various aspects of the subject innovation. Each functional module 1114 is attached to the backplane 1116 by means of a separable electrical connector 1130 that permits the removal of the module 1114 from the backplane 1116 so that it may be replaced or repaired without disturbing the other modules 1114. The backplane 1116 provides the module 1114 with both power and a communication channel to the other modules 1114. Local communication with the other modules 1114 through the backplane 1116 is accomplished by means of a backplane interface 1132 which electrically connects the backplane 1116 through connector 1130. The backplane interface 1132 monitors messages on the backplane 1116 to identify those messages intended for the particular module 1114, based on a message address being part of the message and indicating the message destination. Messages received by the backplane interface 1132 are conveyed to an internal bus 1134 in the module 1114.

The internal bus 1134 joins the backplane interface 1132 with a memory 1136, a microprocessor 1128, front panel circuitry 1138, I/O interface circuitry 1139 and communication network interface circuitry 1141. The microprocessor 1128 can be a general purpose microprocessor providing for the sequential or parallel execution of instructions included within the memory 1136 and the reading and writing of data to and from the memory 1136 and the other devices associated with the internal bus 1134. The microprocessor 1128 includes an internal clock circuit (not shown) providing the timing of the microprocessor 1128 but may also communicate with an external clock 1143 of improved precision. This clock 1143 may be a crystal controlled oscillator or other time standard including a radio link to an external time standard. The precision of the clock 1143 may be recorded in the memory 1136 as a quality factor. The panel circuitry 1138 includes status indication lights such as are well known in the art and manually operable switches such as for locking the module 1114 in the off state.

The memory 1136 can comprise control programs or routines executed by the microprocessor 1128 to provide control functions, as well as variables and data necessary for the execution of those programs or routines. For I/O modules, the memory 1136 may also include an I/O table holding the current state of inputs and outputs received from and transmitted to the industrial controller 1110 via the I/O modules 1120, shown here located on I/O network 1122, for example. The module 1114 can be adapted to perform the various methodologies of the innovation, via hardware configuration techniques and/or by software programming techniques.

It is to be appreciated that while various aspects have been primarily described in context of two data streams, the subject innovation is not so limited and multiple data streams fall within the realm of the subject innovation. Furthermore, while an internal data stream and an external data stream are described, it is to be appreciated that the data streams can include any combination of multiple internal, multiple external, internal and external or multiple internal and external data streams. What has been described above includes various exemplary aspects. It is, of course, not possible to describe every conceivable combination of components or methodologies for purposes of describing these aspects, but one of ordinary skill in the art may recognize that many further combinations and permutations are possible. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
   a coordination component that synchronizes multiple data streams associated with the industrial automation system according to a common timestamp or sequence count generator, wherein each of the multiple data streams has a data sampling rate that defines a rate at which data is collected from the data stream; and
   a sample rate adjustment component that varies the data sampling rate of at least one data stream of the multiple data streams based upon at least one of a predetermined criteria or a predicted required sampling rate.

2. The industrial automation system of claim 1, wherein the multiple data streams include at least one internal data stream and at least one external data stream, wherein the at least one internal data stream comprises internal data from one or more industrial devices and the at least one external data stream comprises network traffic.

3. The industrial automation system of claim 1 further comprising a recognition component that identifies one or more trends in the multiple data streams indicative of a relationship between an event and a cause of the event.

4. The industrial automation system of claim 1, wherein the coordination component weaves together data from the internal and external data streams to synchronize the data according to the common timestamp or sequence count generator.

5. The industrial automation system of claim 1, wherein the sample rate adjustment component further comprising an estimation component that employs an analytical model to automatically predict a required data sampling rate for a stage of an operation associated with the industrial automation system.

6. The industrial automation system of claim 1, wherein the predetermined criteria is at least one of a fault detection or level of granularity for data collection assigned to an operational stage of an industrial process.

7. The industrial automation system of claim 1 further comprising a matching component that subscribes industrial zones with predetermined triggering events of an industrial process.

8. The industrial automation system of claim 5, wherein the data sampling rate can be varied by industrial zone.

9. The industrial automation system of claim 1 further comprising an artificial intelligence component that infers at least one of when, where, or how to vary the data sampling rate based upon at least one of a probabilistic or a statistical model.

10. The industrial automation system of claim 9, wherein the inference is based on prior collected data.

11. The industrial automation system of claim 9, wherein the probabilistic or the statistical model is adjusted based upon user feedback.

12. The industrial automation system of claim 1, wherein the data sampling rate is increased based upon a predetermined fault criteria.

13. A method of collecting data within an industrial plant comprising:
    collecting data from multiple internal and external data streams;
    maintaining a sequence relationship between multiple internal and external data streams based upon at least one of a common time stamp generator or a common sequence count generator; and
    adjusting rate of data collection for at least one of the multiple internal and external data streams based upon a predetermined criteria.

14. The method of claim 13, wherein the multiple internal and external data streams are associated with an industrial process defined by a plurality of functional blocks.

15. The method of claim 14, wherein the predetermined criteria comprises a plurality of triggering events that each correspond to execution of a rate of data collection granularity level associated with a particular functional block.

16. The method of claim 15 further comprising adjusting the rate of data collection based upon user feedback regarding efficiency of collecting data at the granularity level.

17. The method of claim 15 further comprising collecting data based on the plurality of triggering events.

18. The method of claim 15, wherein the predetermined criteria is a fault detection, and the rate of data collection is increased.

19. The method of claim 15, wherein maintaining a sequence relationship further comprising weaving together the multiple internal and external data streams to.

20. An industrial automation system comprising:
    means for synchronizing multiple data streams associated with the industrial automation system according to a common timestamp or sequence count generator, wherein each of the multiple data streams has a data sampling rate that defines a rate at which data is collected from the data stream; and
    means for adjusting the data sampling rate of at least one data stream of the multiple data streams based upon at least one of a predetermined criteria or a predicted required sampling rate.

* * * * *